Aug. 26, 1930.   C. L. SNYDER   1,774,297
DECKING STRUCTURE
Filed Sept. 26, 1929   2 Sheets-Sheet 1

Inventor
Clifford L. Snyder.

By F. V. Bryant
Attorney

Aug. 26, 1930.   C. L. SNYDER   1,774,297
DECKING STRUCTURE
Filed Sept. 26, 1929   2 Sheets-Sheet 2
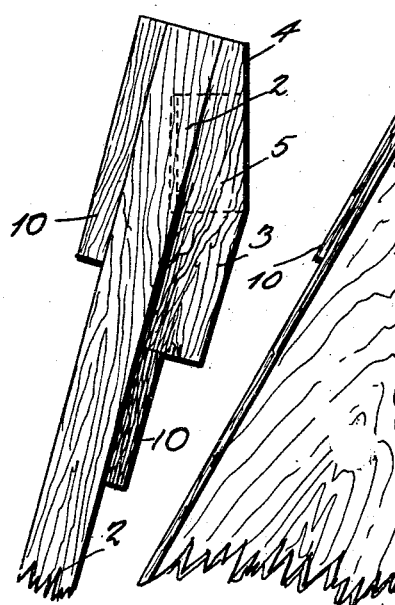
Fig. 2.
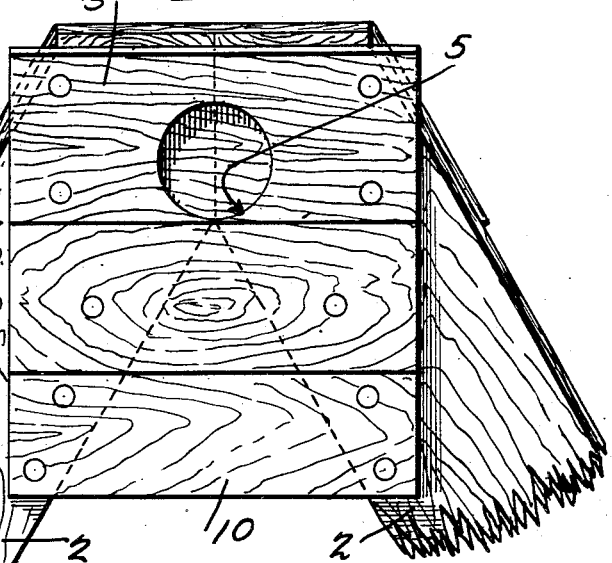
Fig. 3.
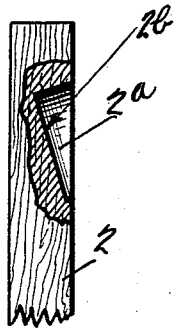
Fig. 4.
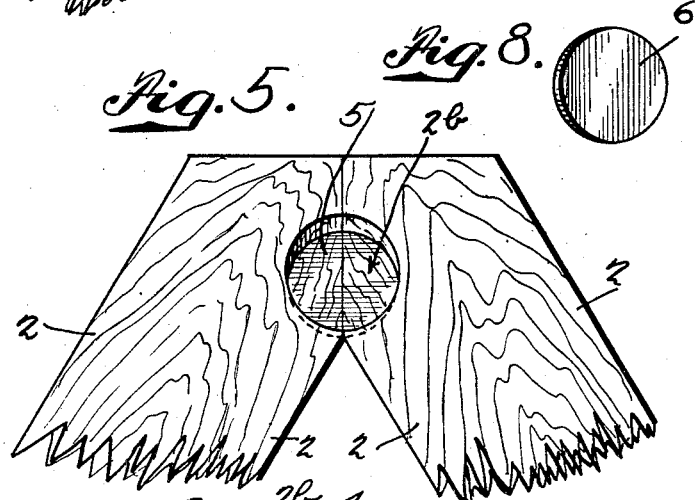
Fig. 5.   Fig. 8.   Fig. 7.
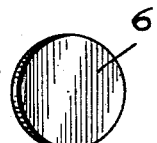
Fig. 6.
Inventor
Clifford L. Snyder.
by
J. H. Bryant
Attorney Patented Aug. 26, 1930

1,774,297

UNITED STATES PATENT OFFICE

CLIFFORD L. SNYDER, OF DETROIT, MICHIGAN, ASSIGNOR TO THE EVANS AUTO LOADING CO. INC., OF DETROIT, MICHIGAN

DECKING STRUCTURE

Application filed September 26, 1929. Serial No. 395,310.

This invention has relation to decking structures for supporting automobiles in freight cars and has for its object the provision of novel means for securing an automobile in position in a freight car, whereby it will be more rigidly held in position and secured against accidental displacement, or injurious contact with other vehicles. The invention consists in the novel construction and arrangement of parts hereinafter described and claimed, constituting a decking device in which the vehicle is stood in a tilted position, with its wheel hubs at its elevated ends supported upon inclined braces, which are firmly secured to the car, the construction of the head block with which the braces are provided being such that the hubs will be held firmly in place without the use of straps, cleats or other appliances to hold them in secure immovable position.

In the accompanying drawings illustrating a preferred embodiment of the invention:

Figure 2 is a side elevation of one of the decking braces;

Figure 3 is an inner face view of the same; and

Figures 4, 5, 6, 7 and 8 are detail views hereinafter more particularly identified.

Figure 1:
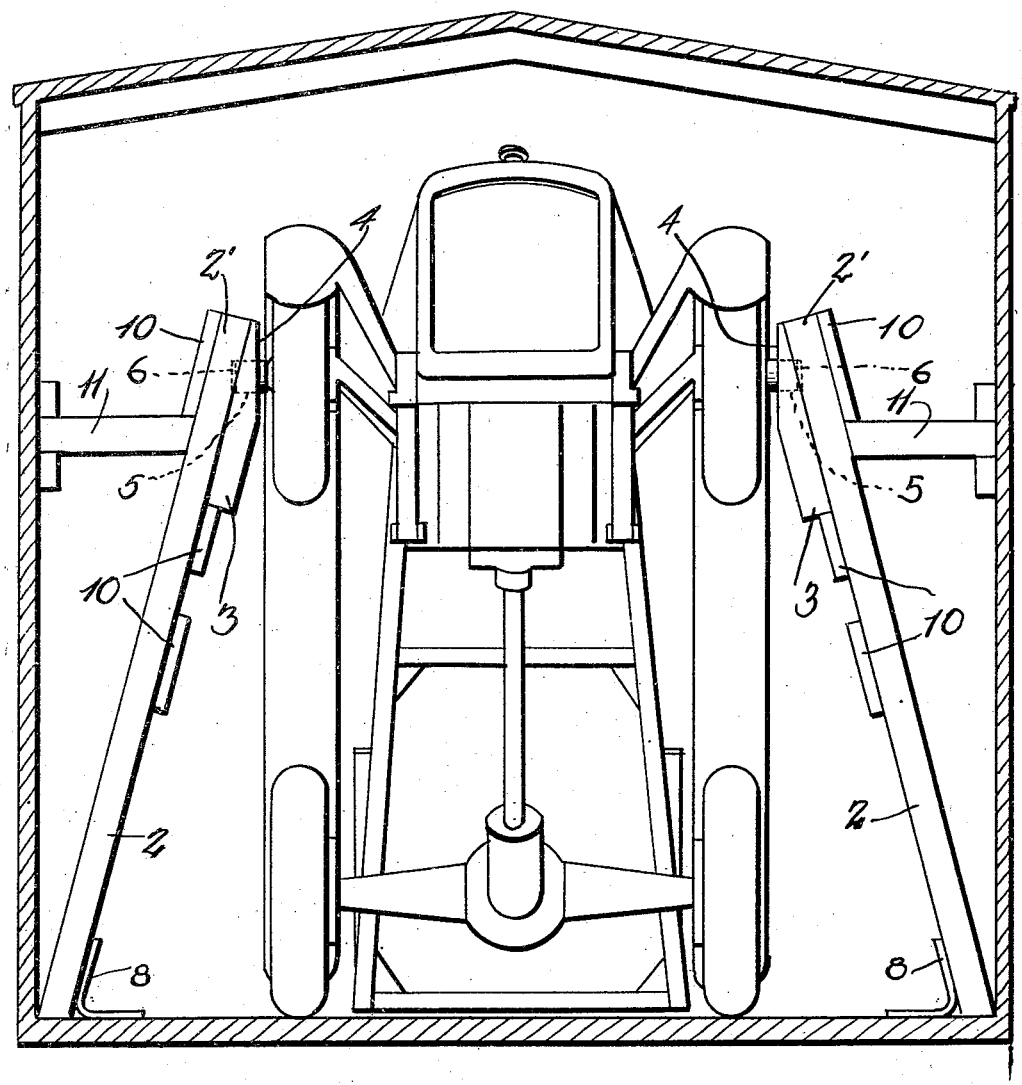
Figure 1 is a vertical transverse sectional view of the body of a freight car, with an automobile decked therein by means of my invention.

In the drawings, a pair of supporting members are shown, each consisting of a pair of uprights or legs, 2, 2 arranged in A-shaped relation, and connected together at the top by means of the transverse head block 3 which is beveled on its upper half on one face as indicated at 4.

Through the center of this beveled portion, a hole 5 is cut, at an oblique angle as illustrated and this hole registers with mating semi-circular recesses 2ª formed in the adjacent sides of the legs 2, the bottom wall 2ᵇ of the recess 2ª being in a plane parallel with the oblique face of the block, and at right angles to the axis of the hole in the head block.

In loading or decking an automobile, the ornamental caps are removed from the hubs of the wheels, front or back, and shipping hub caps made of steel tubing are substituted.

The decking structure is then applied, so as to receive the capped hubs in the holes 5, and the braces are then securely braced against the side walls of the car, and fastened by the cleats 8 to the car floor.

A special advantage of the decking structure, as described, is that by making the shipping caps to the hubs of sufficient length, the outer ends of the caps will bear against the countersunk recesses in upper parts of the legs of the standards or supports and will prevent the decking structure from bearing inwardly against the wheels of the vehicle.

Wear in the countersunk hole may be prevented by inserting a disc of metal 6 in the circular recess 2ª before inserting the shipping hub cap.

It will be noted that the oblique angle on which the circular holes are cut is such that when the legs are spread apart at the bottom and braced against the side of the car, the axes of the holes will be parallel with the axes of the wheel hubs, and will lie horizontally and without undue strain or pressure on the hubs.

In addition to the head block having holes to receive the caps of the hubs, additional cross braces, 10, 10 may be secured to the legs of the decking structure.

When the decking structure is arranged in position, wall braces 11 may be employed to secure greater rigidity.

As will be seen the hub caps and hubs are prevented from jumping out of their sockets by the upper walls of the holes in the head block, and that it is unnecessary to close the sockets by means of cleats or other means.

By cutting the holes entirely through the head block, a larger bearing surface is provided which effectively prevents the hubs and caps from being displaced by any vertical or horizontal shock.

While the invention has been described as a semi-decking structure, it is to be understood that the apparatus may be of the full deck type with the entire vehicle elevated from the car floor and supported at each end by decking apparatus.

I claim:—

1. A decking structure for securing automobiles in freight cars comprising brace members, each forming a support for the vehicle, and consisting of a pair of obliquely inclined legs; a head block with a beveled face secured to the inner face of the brace member at its upper end and having cut therethrough a hole for the reception of a hub cap, and the brace member being formed with a counter-sunk recess in alignment with said hole.

2. A decking structure for securing automobiles in freight cars comprising supporting members, each having attached to its upper end and inner surface a head block having a beveled inner face, and having cut therethrough a circular hole forming a socket for the reception of a hub cap, with its axis at right angles to the beveled surface of the head block.

3. A decking structure for securing automobiles in freight cars comprising supporting members, each including a pair of upwardly converging legs, a head block secured to the upper ends of the legs and having an opening extending completely therethrough, and the upper ends of the legs having a depression therein alined with the opening in the head block.

4. A decking structure for securing automobiles in freight cars comprising supporting members, each including a pair of upwardly converging legs, a head block secured to the upper ends of the legs and having an opening extending completely therethrough, and the upper ends of the legs having a depression therein alined with the opening in the head block, the face portion of the head block having the opening therethrough inclined and the bottom wall of the recess parallel with the inclined face of the block.

In testimony whereof I affix my signature.

CLIFFORD L. SNYDER.